Figure 1:
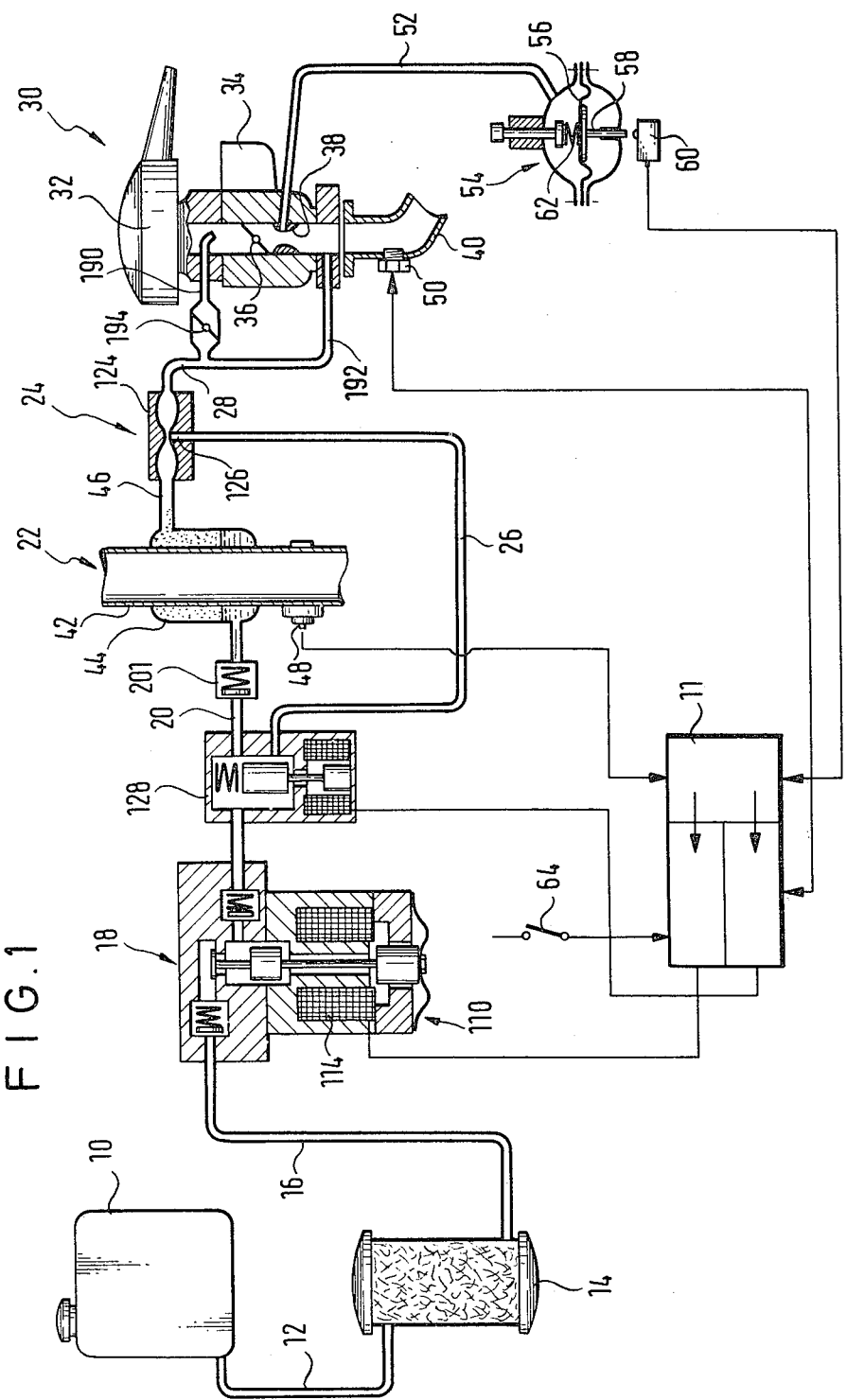

United States Patent [19]

Lohberg

[11] 4,337,731
[45] Jul. 6, 1982

[54] FEED SYSTEM FOR INTRODUCING WATER VAPOR INTO THE SUCTION PATH OF AN INTERNAL COMBUSTION ENGINE

[75] Inventor: Werner Lohberg, Paderborn, Fed. Rep. of Germany

[73] Assignee: Reuter Technologie GmbH, Fed. Rep. of Germany

[21] Appl. No.: 81,796

[22] Filed: Oct. 4, 1979

[30] Foreign Application Priority Data

Oct. 5, 1978 [DE] Fed. Rep. of Germany ....... 2843355

[51] Int. Cl.³ ....................... F02D 19/00; F02M 25/02
[52] U.S. Cl. .................................. 123/25 B; 123/25 J; 123/25 K; 123/25 M; 123/25 P
[58] Field of Search ................ 123/25 B, 25 K, 25 M, 123/25 P, 25 J, 25 L

[56] References Cited

U.S. PATENT DOCUMENTS

| | | | |
|---|---|---|---|
| 3,631,843 | 1/1972 | Yeisei | 123/25 M |
| 3,911,871 | 10/1975 | Williams et al. | 123/25 K |
| 3,968,775 | 7/1976 | Harpman | 123/25 B |
| 4,059,078 | 11/1977 | Ramiro de la Rosa | 123/25 K |
| 4,122,803 | 10/1978 | Miller | 123/25 K |
| 4,161,160 | 7/1979 | Hicks et al. | 123/25 B |
| 4,166,435 | 9/1979 | Kiang | 123/25 B |

*Primary Examiner*—Ira S. Lazarus
*Attorney, Agent, or Firm*—Larson & Taylor

[57] ABSTRACT

This invention relates to a feed system for introducing water in the liquid and/or vaporous state into the suction path of an internal combustion engine, consisting of a water stock vessel, of a heat exchanger, to one side of which exhaust gases from the internal combustion engine can be admitted and to the other side of which the water can be admitted, and of the heat barrier upstream of the heat exchanger, which comprises a metering device for metering the quantity of water, which is to be fed into the suction path, and a control device which controls the metering device as a function of at least one operating parameter of the internal combustion engine.

11 Claims, 6 Drawing Figures

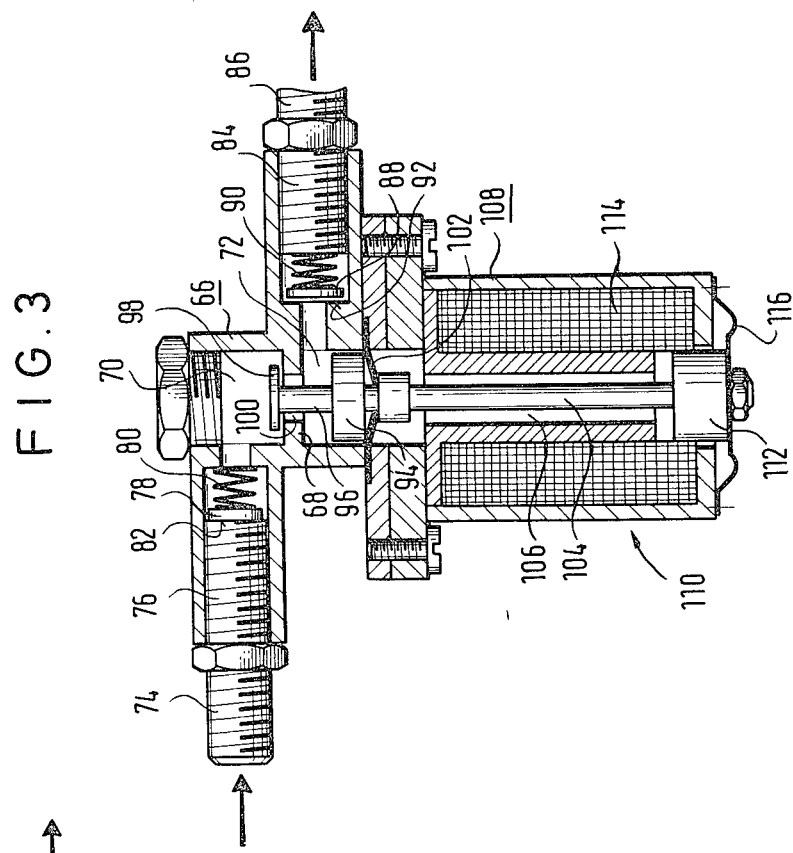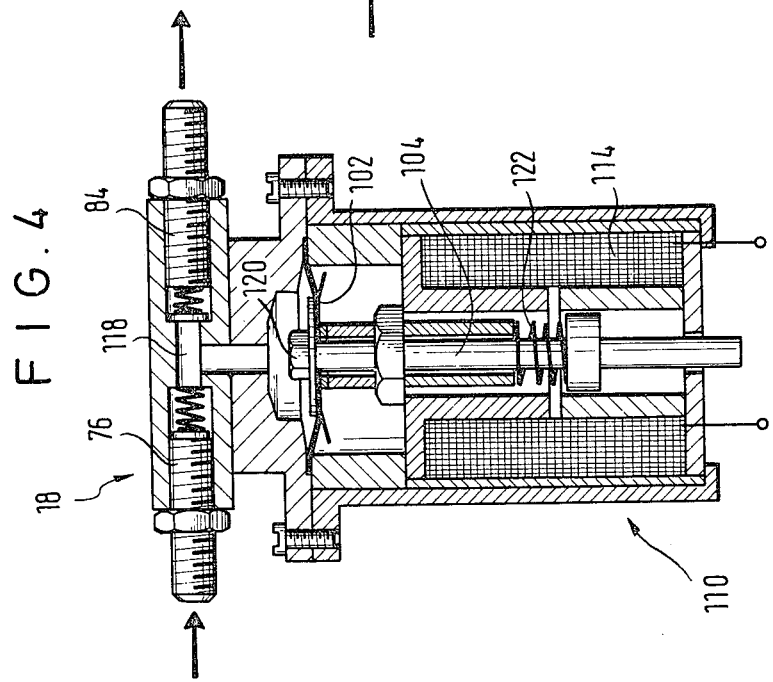

FEED SYSTEM FOR INTRODUCING WATER VAPOR INTO THE SUCTION PATH OF AN INTERNAL COMBUSTION ENGINE

The invention relates to a feed system for introducing water in the liquid and/or vaporous state into the suction path of an internal combustion engine, consisting of a water stock vessel, of a heat exchanger, to one side of which exhaust gases from the internal combustion engine can be admitted and to the other side of which water can be admitted, and of a heat barrier upstream of the heat exchanger.

It is known to feed a water mist and/or water vapor to internal combustion engines in order to improve combustion and hence to raise the efficiency. The improved combustion leads to a reduction in the proportions of CO and carbon in the exhaust gases. In the different operating states of a motor vehicle, however, some unfavorable conditions can occur which lead to overheating in the combustion chamber, so that the formation of nitric oxides is favored. Hitherto, it was necessary for this reason to carry out a catalytic after-oxidation, in order to meet the exhaust gas regulations. This catalytic oxidation, however, leads to a loss of power and to considerably increased manufacturing costs for the internal combustion engine.

It is the object of the invention to effect the feed of a water mist and/or water vapor into the suction path of an internal combustion engine in such a way that, coupled with optimum efficiency, both the CO content and the nitric oxide content of the exhaust gases reach a minimum and that a catalytic after-oxidation is not necessary.

To achieve this object, it is proposed according to the invention to provide a metering device for metering the quantity of water, which is to be fed into the suction path, and a control device which controls the metering device as a function of at least one operating parameter of the internal combustion engine.

To adapt the quantity of water vapor, introduced into the suction path of the internal combustion engine, to the fuel quantity corresponding to the particular operating state of the internal combustion engine, it is proposed according to the invention that the metering device is arranged upstream of the heat exchanger and can be controlled as a function of the speed of the internal combustion engine. Only such a quantity of water is thus fed to the heat exchanger that the water vapor quantity corresponding to the particular operating state of the internal combustion engine is generated. If an excess of hot water vapor were fed into the suction path of the internal combustion engine in the case of a low fuel quantity, this would lead to high temperatures of the mixture, before it reaches the combustion chamber of the internal combustion engine, and hence to unduly high combustion temperatures which are the cause of extensive formation of nitric oxides.

To avoid feeding water to the heat exchanger, as long as the water in the heat exchanger cannot yet be completely vaporized, it is proposed according to the invention that the metering device can be controlled as a function of the exhaust gas temperature in the heat exchanger in such a way that the water is fed to the heat exchanger only when a predetermined temperature threshold value is reached.

As tests on the systems known hitherto have shown, a very high proportion of nitric oxides appears in the exhaust gases during an overrun of the internal combustion engine, that is to say at relatively high speed and with a closed throttle valve. The reason for this is that, as a result of the high vacuum, a large quantity of hot water vapor is drawn in. When the throttle valve is closed, however, only a little fuel is vaporized, so that little heat of vaporization is removed from the water vapor. This leads to high initial temperatures and hence to a rise in the combustion temperature and to increased formation of the nitric oxide. Moreover, when running at high altitudes (above about 2,000 m), overheating of the internal combustion engine readily occurs with a high vapor feed, due to the lower density of the air, and this gives a similar result.

To eliminate this disadvantage, the metering device according to the invention can be controlled as a function of the temperature in the suction path of the internal combustion engine, downstream of the throttle valve, in such a way that the water feed from the heat exchanger is restricted or switched off when a temperature threshold value is reached.

It is also possible to control the metering device as a function of the vacuum in the suction path of the internal combustion engine in such a way that the feed of water to the heat exchanger is restricted with rising vacuum. The difficulties arising on the overrun can also be overcome in this way. It is sufficient here when the water feed is restricted or the water feed to the heat exchanger is switched off at a certain threshold value of the vacuum. In this case, the control device for actuating the metering device can, for example, comprise a vacuum cell which is connected to a point, located downstream of the throttle valve, of the suction path of the internal combustion engine and which, when a threshold value of the vacuum is exceeded, actuates a limit switch which in turn leads to switching-off or to a restriction of the water feed.

In a preferred embodiment of the invention, the metering device comprises a pump, the delivery of which is controlled by the speed of the internal combustion engine. Preferably, the pump is formed by a diaphragm pump, the diaphragm of which can be actuated by means of a ram fixed thereto and designed as the plunger of an electromagnet, and the winding of the electromagnet can be excited at a frequency which is proportional to the speed of the engine. The speed of the internal combustion engine can, for example, be scanned on the contact breaker of the internal combustion engine. Preferably, the control device comprises in this case a pulse generator which is coupled to the contact breaker of the internal combustion engine and which, via a flip-flop circuit, actuates a switch for switching the excitation winding of the pump on and off. To prolong the life of the pump, it is advisable to lower the number of pulses. This can be effected, for example, in such a way that a pulse frequency divider is inserted between the pulse generator and the flip-flop circuit, in order to lower the pulse frequency. The lowering of the pulse frequency can also be utilized for restricting the delivery of the pump, for example in the overrun of the internal combustion engine. For this purpose, a further pulse frequency divider can be provided which is controlled as a function of the temperature in the suction path of the internal combustion engine in such a way that the further pulse frequency divider is switched on, and the pulse frequency is thus lowered, when the temperature in the suction path of the internal combustion engine rises above a predetermined temperature threshold value.

The pump is preferably formed integrally with the heat barrier. This can be effected in such a way that the pump comprises a pump chamber which is connected to an inlet valve and an outlet valve and in which a pump piston which can be actuated by a diaphragm is arranged in such a way that, under the action of a return spring, it blocks the passage between the inlet and outlet valves when the winding of the electromagnet is not excited. As in the case of the heat barrier known from German patent application P No. 2,604,050, a transfer of heat from the heat exchanger to the water stock tank and to the metering device is thus avoided.

According to another embodiment of the invention, the metering device comprises a pump and a metering valve arrangement which is located downstream of the pump and which can be controlled as a function of the speed of the internal combustion engine in the direction of a greater throughput when the speed rises. To keep the expenditure on controls as low as possible, the metering valve arrangement preferably comprises at least two metering valves which can be actuated at different speed values by means of the control device. This means that the first metering valve is opened when a certain first speed value is exceeded, whilst the second metering valve is opened only when a second speed value at a higher level is exceeded. Preferably, the metering valves are formed by solenoid valves, in which case the control circuit comprises a pulse generator coupled to the contact breaker of the internal combustion engine and, downstream thereof, a frequency/voltage convertor, the output signal of the latter being fed to two comparators which are adjusted to different threshold values and each of which is connected via a switch to the excitation winding of one of the solenoid valves.

The pump of the embodiment discussed last can be a conventional pump which is driven electrically or mechanically.

To regulate the temperature of the mixture in the suction path of the internal combustion engine and, in particular, to lower the temperature of the mixture on the overrun of the internal combustion engine, it is also proposed according to the invention that the temperature of the water and/or water vapor fed into the suction path of the internal combustion engine can be regulated as a function of an operating parameter of the internal combustion engine. This solution can be used both on its own and, in a particularly advantageous manner, in conjunction with the metering device described above. The temperature of the water vapor fed in can be regulated both as a function of the temperature of the mixture in the suction path downstream of the throttle valve and as a function of the vacuum downstream of the throttle valve.

The temperature regulation can be effected, say, in such a way that a second heat exchanger in the form of a cooler is provided downstream of the heat exchanger and that the flow rate of the coolant can be regulated as a function of the operating state of the internal combustion engine. In another possibility, a second heat exchanger in the form of a vapor-mixing device is provided, downstream of the heat exchanger, which has a valve device, which is controllable by the operating parameter of the internal combustion engine, for feeding in a vapor at a lower temperature, in order to obtain a vapor mixture which has the desired temperature.

According to a preferred embodiment of the invention, a second heat exchanger in the form of a mixing device is provided, downstream of the heat exchanger, in which water can be admixed, in a quantity depending on the operating state of the internal combustion engine, to the vapor coming from the heat exchanger. The mist formation thus effected leads to a rapid lowering of the vapor temperature so that excessive heating of the mixture, before it enters the combustion chamber, by the vapor introduced is avoided.

According to a simple embodiment, the mixing device comprises a venturi tube located in the flow path of the water vapor, a distributor device controlling the inflow of water to the nozzle zone of the venturi tube as a function of the operating state of the internal combustion engine. Preferably, the distributor device is designed as a solenoid valve which can be actuated via an electrical control circuit. As an alternative thereto, it would also be possible for a second pump to deliver the water to the mixing device. Preferably, the solenoid valve is actuated as a function of a thermosensor in the suction path of the internal combustion engine, downstream of the throttle valve. The temperature sensor can be designed in such a way that, when the temperature in the suction path rises above a predetermined threshold value, it emits a pulse which is transmitted via a pulse former to the base of a switching transistor which is thus switched into conduction and feeds the winding of the solenoid valve. As the temperature sensors for the case described above and also for the illustrative embodiments described further above, resistances are proposed, the resistivities of which have sudden changes within a temperature range with narrow limits. For example, metal oxide resistances are resistances of this type.

It has been found in tests that the most favorable feed points for the water and/or the water vapor into the suction path of the internal combustion engine are located upstream and downstream of the point where mixing of air and fuel takes place, that is to say customarily upstream and downstream of the carburetor. In this case, according to a preferred embodiment, about 75% of the vapor are fed in upstream of the throttle valve and about 25% are fed in downstream of the throttle valve.

Figure 2:
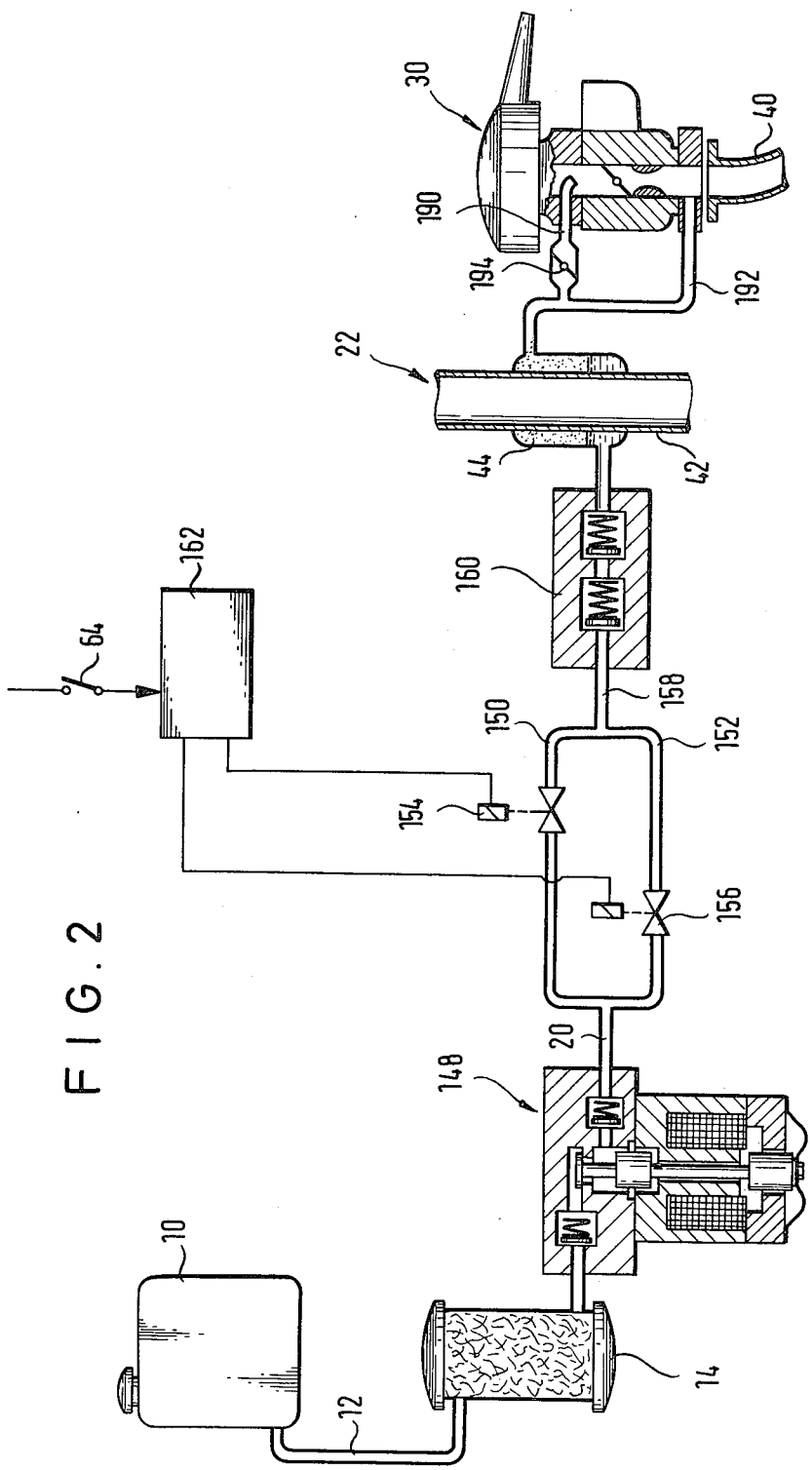
Figure 5:
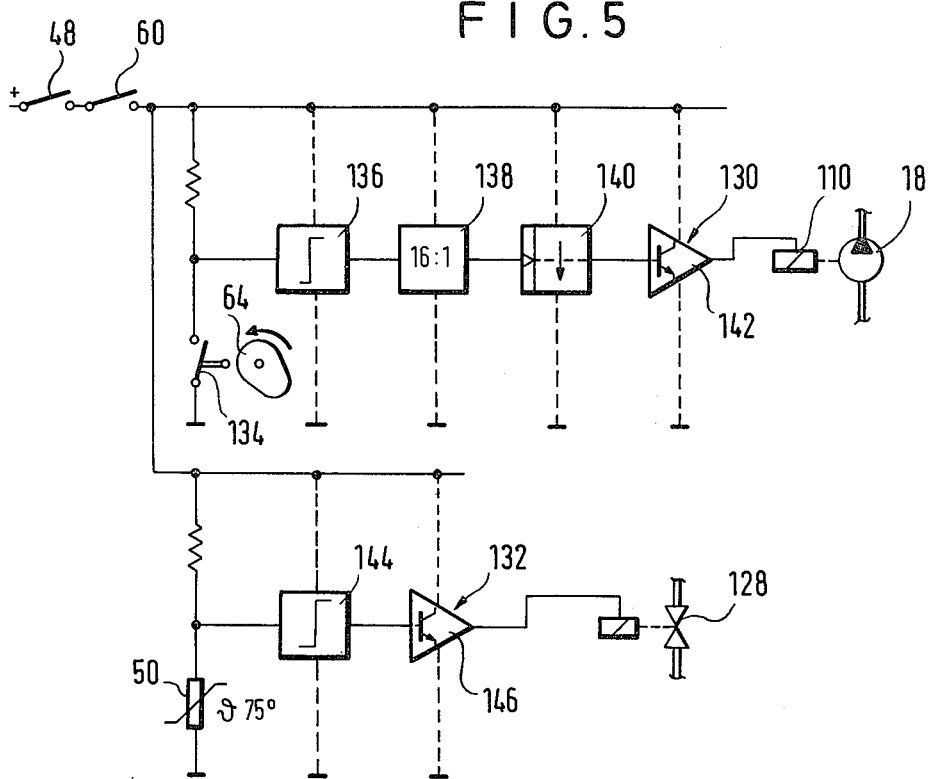
Figure 6:
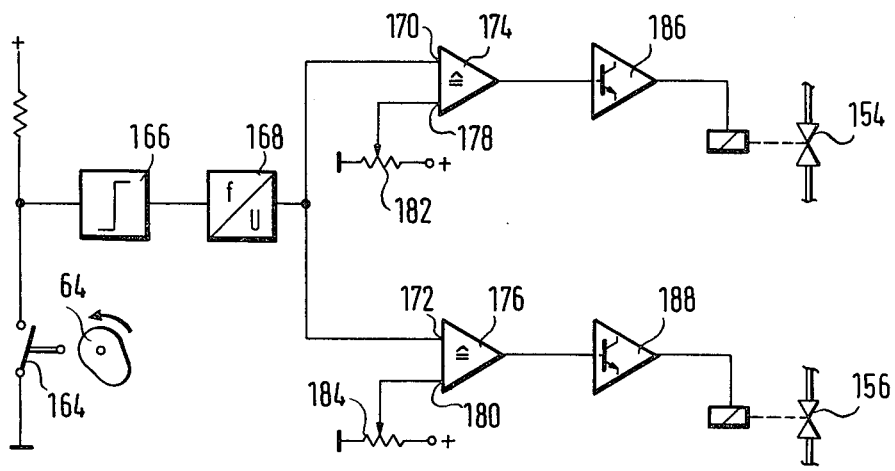

Further features and advantages of the invention can be seen from the sub-claims and the description which follows and which explains the invention by reference to illustrative embodiments in conjunction with the attached figures in which:

FIG. 1 shows a schematic representation of a first embodiment of the feed system according to the invention, FIG. 2 shows a schematic representation of a second embodiment of the feed system according to the invention, FIG. 3 shows an enlarged representation of the pump shown in FIGS. 1 and 2, according to a first embodiment of the invention, FIG. 4 shows an enlarged representation of the pump shown in FIGS. 1 and 2, according to a second embodiment of the invention, FIG. 5 shows a schematic circuit diagram of the control circuit for a feed system according to FIG. 1, and FIG. 6 shows a schematic circuit diagram of the control circuit for a feed system according to FIG. 2.

The feed system, shown in FIG. 1, for introducing water in the liquid and/or vaporous state into the suction path of an internal combustion engine comprises a water stock vessel 10 and a filter 14 which is connected thereto via a line 12 and which is adjoined via a line 16 by a pump generally marked 18. From the delivery side of the pump 18, a line 20 leads via a distributor device in the form of a controllable 2-way solenoid valve 128 and a valve 201 to a heat exchanger 22 which is adjoined by a mixing device 24 for mixing the vapor, formed in the heat exchanger 22, with water which is fed to the mixing device 24 directly, by-passing the heat exchanger 22, from the delivery side of the pump 18 via the solenoid valve 128 and a line 26. In a manner which will yet be described in more detail, a line 28 leads from the mixing device to the mixture formation system 30 of an internal combustion engine, which is not shown, comprising an air filter 32, a carburetor 34 with a throttle valve 36 and a venturi throat 38 as well as a suction line 40.

The heat exchanger 22 comprises an exhaust gas pipe 42, through which the hot exhaust gases from the internal combustion engine flow and which is surrounded by an outer jacket 44 into which water flows from the pump 18 via the line 20 and from which the water, after vaporization on the hot exhaust gas pipe 42, flows out via the line 46 towards the mixing device 24.

A first temperature sensor 48 for measuring the exhaust gas temperature is located on the exhaust gas piper 42.

A second temperature sensor 50 for measuring the temperature of the mixture immediately before it enters the combustion chamber of the internal combustion engine, is located on the suction line 40 downstream of the carburetor 34. The two temperature sensors 48 and 50 are preferably formed by temperature-dependent resistances, of which the change in resistance takes place within a narrow temperature range. Temperature-dependent resistances of this type are, for example, certain metal oxide resistances (MOXIE).

A vacuum cell 54 with a spring-loaded diaphragm 56, to which a ram 58 which can be moved up and down by the diaphragm is fixed, is connected to the suction line 40 in the zone of the venturi throat 38 via a vacuum line 52. In the rest position of the vacuum cell 54, that is to say when no vacuum or only a slight vacuum acts on that side of the diaphragm 56 which faces the vacuum line 52, this ram actuates a limit switch 60, the functioning of which will be described in more detail below. When a high vacuum occurs downstream of the throttle valve 36, the diaphragm 56, and together with it the ram 58, are moved against the spring force of the spring 62 and the ram 58 is thus lifted off the limit switch 60.

The diagrammatically indicated contact breaker 64 of the internal combustion engine can also be seen in FIG. 1. Together with the temperature sensors 48 and 50 as well as the limit switch 60, this contact breaker provides the input values for a control circuit generally marked 11, as is indicated by the arrows leading from the contact breaker 64, the temperature sensors 48, 50 and the limit switch 60 to the control circuit 11. As a function of the input values thus received, the control circuit 11 controls the pump 18 and also the solenoid valve 128, as is indicated by the arrows leading from the control device 11 to the pump 18 and to the solenoid valve 128. Before the design of the control circuit and the mode of operation of the feed system are discussed, two illustrative embodiments of the diaphragm pump 18, driven as a function of the speed of the internal combustion engine, are to be described first.

The embodiment shown in FIG. 3 comprises a pump casing 66 with a pump chamber which is subdivided by an annular projection 68 pointing radially inwards into two half chambers 70 and 72. The upper half chamber 70 is connected via an inlet valve 76 to an inlet branch 74. The inlet valve 76 has a valve disc 78 which is tensioned against a valve seat 82 by means of a spring 80. The lower half chamber 72 is connected via an outlet valve 84 to an outlet branch 86. The outlet valve 84 has a valve disc 88 which is tensioned against a valve seat 92 by means of a spring 90.

In the lower half chamber 72, a piston 94 can be moved up and down, of which the end facing the half chamber 70 carries, on a cylindrical projection 96, a valve element 98 which, in the lower position of the piston 94, closes the aperture 100 in the annular projection 68.

The piston 94 is fixed to a diaphragm 102 to which a ram 104 is fastened on the side facing away from the piston 94, which ram plunges into the central bore 106 of an electromagnet 110, the pot-shaped housing 108 of which is flanged to the pump casing 66. The ram 104 here carries on its end away from the diaphragm a piston-like thickening 112 which, when the winding 114 of the electromagnet 110 is not excited, partially protrudes from the central bore 106 and is held in this position by a leaf spring 116 which is fixed to the pot-shaped housing 108. When the winding 114 is excited, the thickening 112 is drawn into the central bore 106 against the resistance of the leaf spring and the piston 94 is thus pressed upwards via the ram 104 and the diaphragm 102. The liquid contained in the lower half chamber 72 is thus forced out of the pump chamber through the outlet valve 84. When the electromagnet 110 is switched off, the piston 94 is again pressed downwards by the leaf spring 116 via the diaphragm 102 and the ram 104, liquid being drawn into the upper half chamber 70 via the inlet valve 76. The diaphragm 102 mainly serves for sealing the pump chamber 70, 72 so that the piston 94 can have a slightly smaller diameter than the lower half chamber 72. This has the advantage that the piston 94 cannot jam due to expansion of the material when the pump 18 warms up.

The two valves 76 and 84 together form a heat barrier which prevents a transfer of heat from the heat exchanger 22 back to the water stock vessel 10. Compared with the conventional heat barrier, the pump 18 according to the invention has, however, a decisive advantage. In a heat barrier which works automatically, the internal combustion engine extracts the vapor vapor from the heat exchanger until the water pressure applying to the heat barrier can open the valves of the heat barrier. Since there is a considerable difference between the maximum vapor pressure and the upstream water pressure, a continually fluctuating quantity of vapor is supplied to the suction system and, moreover, this is the smaller, the smaller the vacuum in the suction system. Precisely in the case of a small vacuum, which corresponds to opening of the throttle valve, however, a large quantity of fuel is drawn in and, consequently, a large quantity of water vapor would also have to be fed in in order to make the heat of vaporization for the fuel available. This is now accomplished by the pump 18 according to the invention, the number of strokes of which is dependent on the speed of the internal combustion engine. Thus, as can readily be seen, the quantity of vapor made available by the heat exchanger rises proportionally to the speed of the internal combustion engine since, with rising speed, the pump 18 delivers more water into the heat exchanger. The inlet valve 76 here works as a non-return valve in the direction of the water vessel 10, and the outlet valve 84 prevents the water vapor from acting back on the pump 18.

The second embodiment of the pump 18 according to the invention, described in FIG. 4, differs from the pump described above essentially in that the inlet valve 76 and the outlet valve 84 are in a mutually aligned position, separated from one another only by a bore 118. A piston 120 can be moved in the bore 118 by means of the diaphragm 102, which piston has the purpose of blocking the bore 118 as well as drawing in water through the inlet valve 76 and delivering it through the outlet valve 84. When current does not flow through the winding 114, the coil spring 122 forces the piston 120 via the ram 104 and the diaphragm 102 into the bore 118. In operation, the pump works by way of the diaphragm 102 and the valves 76 and 84, and additionally with the piston 120, as a pump having a pressure which is increased as compared with a simple diaphragm pump.

The mixing device 24 shown in FIG. 1 comprises a venturi tube 124 which is located between the lines 46 and 28 and through which the water vapor drawn from the outer jacket 44 of the heat exchanger 22 flows. A nozzle 126 connected to the line 26 ends in the throat zone of the venturi tube 124, and the connection between the pump 18 and the nozzle 126 can be blocked by a solenoid valve 128. With the solenoid valve 128 open, water is injected into the venturi tube 124 through the nozzle 126 and is atomized to give fine mist droplets when it enters into the hot vapor flowing through. The hot vapor flowing through is thus cooled.

The control circuit 11, shown in FIG. 5, for the feed system reproduced in FIG. 1 comprising a pump control circuit 130 and a mixer control circuit 132. The two circuits are connected via the limit switch 60 and the thermo-sensor 48 to the positive pole of a voltage source. When the limit switch 60 is opened by the ram of the vacuum cell 54 because of a high vacuum in the suction line 40, neither the pump 18 nor the solenoid valve 128 are supplied with current so that no water feed at all to the suction system of the internal combustion engine takes place. The same applies as long as the exhaust gas temperature in the exhaust gas pipe 42 has not yet reached a defined temperature threshold value which in the present case is about 110°. This temperature enables the water fed to the heat exchanger 22 to be vaporized. Below 100°, however, the water would not be vaporized completely.

The pump control circuit 130 comprises a pulse generator 134 which is controlled by the contact breaker 64 of the internal combustion engine. The pulses generated by the pulse generator 134 are transmitted to a pulse former 136. The pulse frequency is reduced in the ratio of 16:1 in a pulse frequency divider 138. In a monostable multi-vibrator 140 following the pulse frequency divider 138, a pulse of a duration of about 20 milliseconds is generated. The output of the monostable multi-vibrator 140 is connected to the base of a power transistor 142 which is switched into conduction by the output signal of the monostable multi-vibrator, whereby the linear motor 110 or the winding 114 of the pump 18 is excited and the latter is thus set in motion.

It would also be possible, downstream of the pulse frequency divider 138, to provide a further pulse frequency divider which, for example, halves the frequency again and thus reduces the output of the pump 18 as a function of the thermo-sensor 50 when the temperature rises above a defined threshold value in the suction line 40.

The mixer control circuit 132 is controlled by the thermo-sensor 50. When the temperature in the suction line 40 rises above about 75°, this sensor generates a pulse which is fed to a pulse former 144 which in turn controls the base of a transistor 146. In this way, the transistor 146 is switched into conduction and the winding of the solenoid valve 128 is thus excited. When current flows through the winding of the solenoid valve 128, this is switched over so that water is admixed to the stream of vapor flowing through the venturi tube 124.

As already stated above, the thermo-sensors are formed by temperature-dependent resistances. In order to achieve reliable switching with these temperature-dependent resistances, the latter show hysteresis behaviour within their switching range.

The embodiment of the feed system according to the invention, shown in FIG. 2, differs from the embodiment according to FIG. 1 in that the pump 148 is driven in a manner which is not dependent on the speed. Any desired suitable pump can be used here. The line 20 adjoining the delivery side of the pump 148 forks into two branches 150 and 152 which can each be blocked by a solenoid valve 154 and 156 respectively. Downstream of the two solenoid valves 154 and 156, the two line branches 150 and 152 join up again to a line 158, a heat barrier 160 as described in German Laid-Open Application No. 2,604,250 being located between the line 158 and the heat exchanger 22.

The two solenoid valves 154 and 156 can be controlled via a valve control circuit 162 as a function of the speed or of the switching frequency of the contact breaker 64 of the internal combustion engine.

The valve control circuit 162 is reproduced in FIG. 6. A pulse generator 164 is coupled to the contact breaker 64. The pulses thus generated are transmitted via a pulse former to a frequency/voltage convertor 168. The voltage signal generated by the latter is fed, respectively, to one input 170, 172 of a comparator 174 or 176. A voltage which is adjustable by a variable resistance 182 or 184 is applied in each case to the other input 178, 180 of the comparator 174 or 176 respectively. The two voltages at the resistances 182, 184 are here different. When the voltage signal at the particular input 170 or 172 of the comparators 174 and 176 reaches the threshold value applied in each case to the other input 178 or 180 respectively, an output signal appears on the comparator, which output signal switches one of the power transistors 186 or 188 into conduction. In this way the valves 154 or 156 are opened. Since the threshold values on the two comparators 174 and 176 are set to different levels, the solenoid valves 154 and 156 open at different speeds of the internal combustion engine so that the quantity of water fed to the heat exchanger 22 can be metered according to the speed of the internal combustion engine.

In the feed system represented in FIG. 2, neither a thermo-sensor on the exhaust gas pipe 42 nor a thermo-sensor on the suction line 40 nor a vacuum cell 54 were shown. It is to be understood that all three sensors can also be installed in the feed system according to FIG. 2, in which case the control device 162 would then have to be complemented corresponding to the control circuit in FIG. 5.

The pump 148 can likewise be formed by one of the pumps described by reference to FIGS. 3 and 4. However, a simple conventional, mechanically driven pump also suffices.

As can be seen in FIGS. 1 and 2, the water vapor is fed to the suction system via two lines 190 and 192. The line 190 ends in the suction line 40 above the carburetor 34. About 75% of the water vapor are introduced via this line into the suction line 40. The lower line 192 ends in the suction line 40 below the carburetor 34. Via this line, about 25% of the hot vapor are fed in. To prevent air being drawn in via the lines 190 and 192, by-passing the throttle valve 36, when the vapor feed is switched off and when the throttle valve is closed, a shut-off element 194 is provided in the line 190. Under certain circumstances, it is also sufficient to design the connecting line in such a way that it has a sufficiently high flow resistance for air. Thus, for example, the connecting line could also be designed as a hose with an inserted helix.

Moreover, it should be noted that it would also be possible to use, in place of the vacuum cell 54, a contact on the throttle valve or on the gas linkage of the internal combustion engine, in order to detect overrunning. This does not, however, cover the case of driving at high altitudes or under other conditions which lead to overheating of the internal combustion engine.

The feed system according to the invention ensures adaptation of the quantity of water vapor to be fed in to the particular operating state of the internal combustion engine so that overheating of the mixture before it enters the combustion chamber of the internal combustion engine can be avoided and thus, in particular, the production of nitric oxides can be substantially reduced.

I claim:

1. A feed system for introducing water in the liquid and/or vapor state into the suction path of an internal combustion engine, comprising a water reservoir and a first heat exchanger means for receiving exhaust gases from the internal combustion engine and for receiving water from said reservoir in heat exchange relationship with said exhaust gases, said system further comprising a second heat exchanger means, located downstream of said first heat exchanger means and upstream of said suction path, for regulating the temperature of the water and/or steam to be fed into the suction path as a function of an operating parameter of the suction path.

2. A feed system as claimed in claim 1, wherein said second heat exchanger means regulates the said temperature as a function of the temperature of the mixture in the suction path of the internal combustion engine.

3. A feed system as claimed in claim 1 or 2, wherein said second heat exchanger means regulates the said temperature as a function of the vacuum in the suction path of the internal combustion engine.

4. A feed system as claimed in any one of claims 1 and 2, wherein said second heat exchanger means comprises a cooler located downstream of the first heat exchanger means and wherein the flow rate of coolant is regulated as a function of the operating state of the internal combustion engine.

5. A feed system as claimed in any one of claims 1 and 2, wherein said second heat exchanger means comprises a vapor-mixing device which has a valve means, controlled by an operating parameter of the internal combustion engine, for controlling feeding of a vapor to said vapor-mixing device in order to adjust the vapor mixture to a defined temperature.

6. A feed system as claimed in any one of claims 1 and 2, wherein said second heat exchanger means comprises a mixing device in which water can be admixed, in a quantity depending on the operating state of the internal combustion engine, with the vapor coming from the first heat exchanger means.

7. A feed system as claimed in claim 6, wherein the mixing device comprises a venturi tube located in the flow path of the water vapor and a distributor device is provided which controls the inflow of water to the throat zone of the venturi tube.

8. A feed system as claimed in claim 7, wherein the distributor device comprises a solenoid valve which can be actuated via an electrical control circuit.

9. A feed system as claimed in claim 8, wherein the control circuit comprises a thermo-sensor and a pulse former which is connected to said thermosensor and the output signal of which causes switching of a switching transistor into conduction, thereby energizing a control winding of the solenoid valve.

10. A feed system as claimed in claim 9, wherein the thermo-sensor is formed by a temperature-dependent resistance, the resistivity of which significantly changes within a temperature range with narrow limits.

11. A feed system as claimed in claim 10, wherein the resistance is formed by a metal oxide resistance.

* * * * *